(12) United States Patent
Nakamura

(10) Patent No.: US 10,819,190 B2
(45) Date of Patent: Oct. 27, 2020

(54) MOTOR

(71) Applicant: Nidec Corporation, Kyoto (JP)

(72) Inventor: Yoshinobu Nakamura, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 16/322,625

(22) PCT Filed: Aug. 17, 2017

(86) PCT No.: PCT/JP2017/029501
§ 371 (c)(1),
(2) Date: Feb. 1, 2019

(87) PCT Pub. No.: WO2018/034316
PCT Pub. Date: Feb. 22, 2018

(65) Prior Publication Data
US 2019/0199174 A1 Jun. 27, 2019

(30) Foreign Application Priority Data
Aug. 18, 2016 (JP) .................. 2016-160654

(51) Int. Cl.
H02K 9/20 (2006.01)
H02K 9/19 (2006.01)
(52) U.S. Cl.
CPC .............. H02K 9/20 (2013.01); H02K 9/19 (2013.01)
(58) Field of Classification Search
CPC .................... H02K 9/19; H02K 9/20
(Continued)

(56) References Cited

U.S. PATENT DOCUMENTS

2011/0305587 A1* 12/2011 D'Amico .............. H02K 5/132
417/405
2018/0231325 A1 8/2018 Yu et al.

FOREIGN PATENT DOCUMENTS

EP   3 333 529 A1   6/2018
JP   9-23614 A      1/1997
(Continued)

OTHER PUBLICATIONS

Official Communication issued in European Patent Application No. 17841538.6, dated Feb. 3, 2020.
(Continued)

Primary Examiner — Terrance L Kenerly
(74) Attorney, Agent, or Firm — Keating & Bennett, LLP

(57) ABSTRACT

A motor includes a rotor, a stator having a cylindrical shape, disposed on a radial-direction outer side of the rotor, and surrounding the rotor, and a housing having a cylindrical shape, disposed on the radial-direction outer side of the stator, and housing the rotor and the stator. The stator includes teeth disposed along a circumferential direction and extending in a radial direction, and coils wound around the teeth. A hermetically sealed chamber filled with a cooling medium is provided between the housing and the rotor. A space housing the rotor core is provided on a radial-direction inner side of the sealed chamber that includes an inner chamber housing the coils, outer chambers disposed on the radial-direction outer side of the inner chamber and extend in the circumferential direction, and upper and lower connection portions located vertically above or below a shaft and connect the inner chamber to the outer chambers.

13 Claims, 8 Drawing Sheets

(58) Field of Classification Search
USPC .......................................................... 310/54
See application file for complete search history.

(56) References Cited

FOREIGN PATENT DOCUMENTS

| | | |
|---|---|---|
| JP | 2015-095961 A | 5/2015 |
| JP | 2017-36844 A | 2/2017 |
| SU | 864438 A1 | 9/1981 |

OTHER PUBLICATIONS

Official Communication issued in International Patent Application No. PCT/JP2017/029501, dated Nov. 28, 2017.

* cited by examiner

MOTOR

BACKGROUND OF THE INVENTION

1. Field of the Invention

The present disclosure relates to a motor.

2. Description of the Related Art

In a cooling device for cooling a motor, a liquid refrigerant may remove the heat of a casing and evaporate, thereby cooling the motor via the casing.

In the cooling device as described above, a condenser is required to return the liquid refrigerant evaporated to gas into liquid again. Because the amount of liquid refrigerant to be evaporated increases as the temperature of the object generating heat and to be cooled becomes higher, a large condenser is required. Therefore, there is a problem that when the cooling device is mounted on the motor, the whole motor becomes large.

SUMMARY OF THE INVENTION

A motor according to one example embodiment of the present disclosure includes a rotor including a shaft centered on a center axis that extends in a horizontal direction and a rotor core fixed to the shaft; a stator that has a cylindrical shape, that is disposed on a radial-direction outer side of the rotor, and that surrounds the rotor, and a housing that has a cylindrical shape, that is disposed on the radial-direction outer side of the stator, and that houses the rotor and the stator. The stator includes a plurality of teeth disposed along a circumferential direction and extending in a radial direction, and a plurality of coils wound around the plurality of teeth, respectively. A sealed chamber hermetically sealed and filled with a first cooling medium is provided between the housing and the rotor. A housing space in which the rotor core is housed is provided on a radial-direction inner side of the sealed chamber. The sealed chamber includes an inner chamber that houses the plurality of coils; outer chambers that are disposed on the radial-direction outer side of the inner chamber and that extend in the circumferential direction; upper connection portions that are located vertically above the shaft and that connect the inner chamber and the outer chambers to each other; and lower connection portions that are located vertically below the shaft and that connect the inner chamber and the outer chambers to each other.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Figure 1:
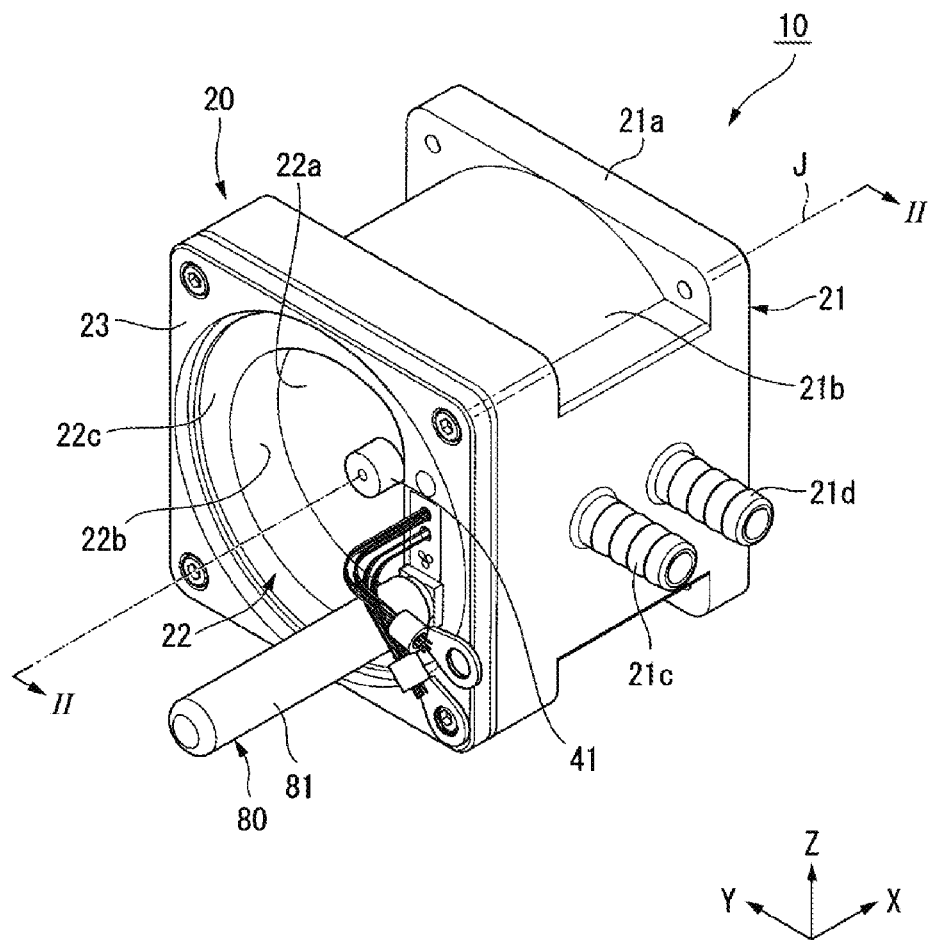
FIG. 1 is a perspective view illustrating a motor of an example embodiment of the present disclosure.
Figure 2:
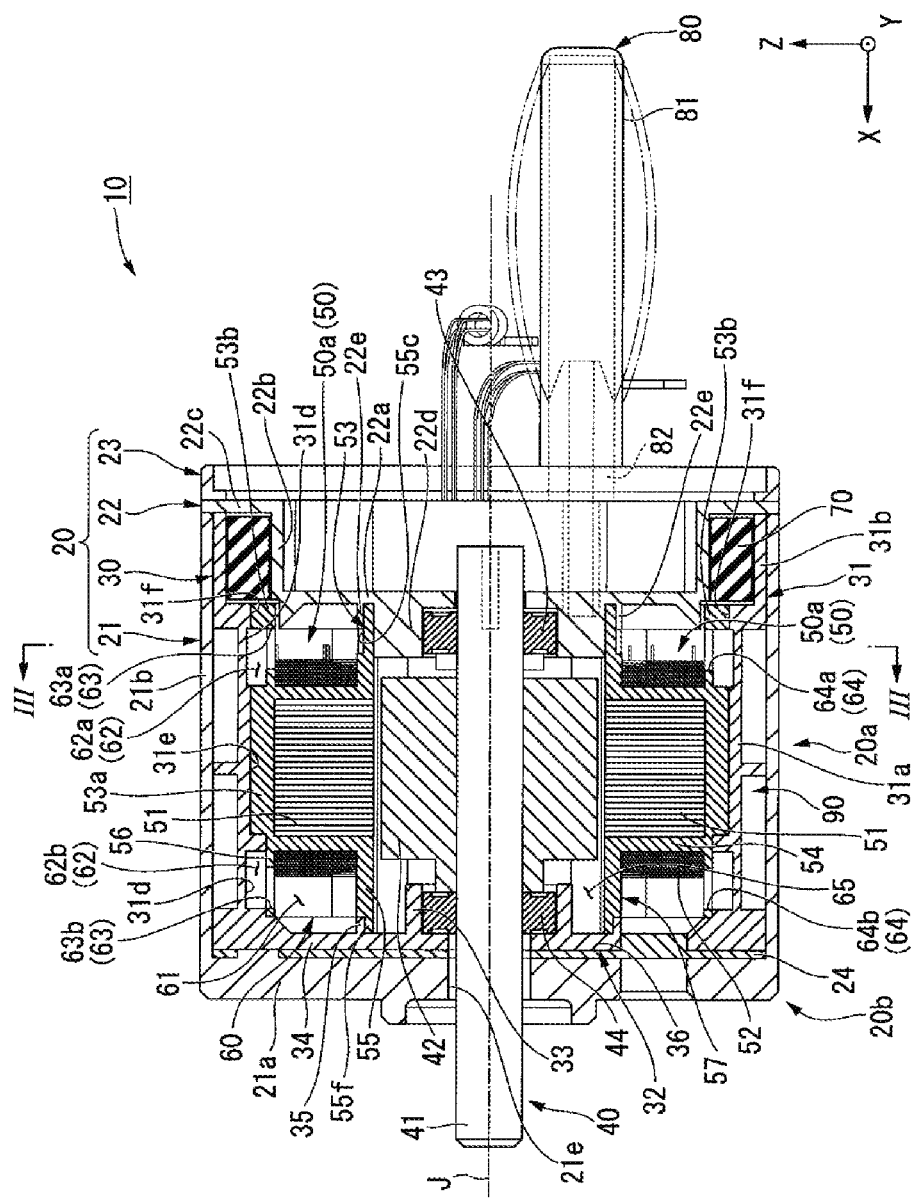
FIG. 2 is a view illustrating a motor of an example embodiment of the present disclosure and is a sectional view taken along the line II-II in FIG. 1.

As illustrated in FIG. 1 and FIG. 2, a motor 10 of the present embodiment includes a rotor 40, a stator 50, a housing 20, a sealing member 70, and a pressure-adjusting device 80. As illustrated in FIG. 2, the rotor 40 has a shaft 41 centered on a center axis J extending in the horizontal direction and a rotor core 42 fixed to the shaft 41. As will be described in detail later, the motor 10 of the present embodiment has a cooling unit that uses a first cooling medium CM1 inside the motor 10.

In the following description, a direction parallel to the horizontal direction in which the center axis J extends will simply be referred to as "axial direction", a radial direction with the center axis J as a center will simply be referred to as "radial direction", and a circumferential direction with the center axis J as a center will simply be referred to as "circumferential direction". In addition, in the XYZ axes illustrated in the figures, the X-axis direction is the axial direction. The Y-axis direction is one of the horizontal directions perpendicular to the X-axis direction. The Z-axis direction is a vertical direction perpendicular to both of the X-axis direction and the Y-axis direction. The Z-axis-direction positive side, that is, the upper side in FIG. 2 is the vertical-direction upper side and will simply be referred to as "upper side". The Z-axis-direction negative side, that is, the lower side in FIG. 2 is the vertical-direction lower side and will simply be referred to as "lower side". In addition, the X-axis-direction negative side will be referred to as "front side". The X-axis-direction positive side will be referred to as "rear side". In the present embodiment, the X-axis-direction negative side, that is, the front side, corresponds to one axial-direction side and the X-axis-direction positive side, that is, the rear side, corresponds to the other axial-direction side. Further, the front side and the rear side are simply used for explanation, and do not limit actual positional relationships and directions.

Figure 3:
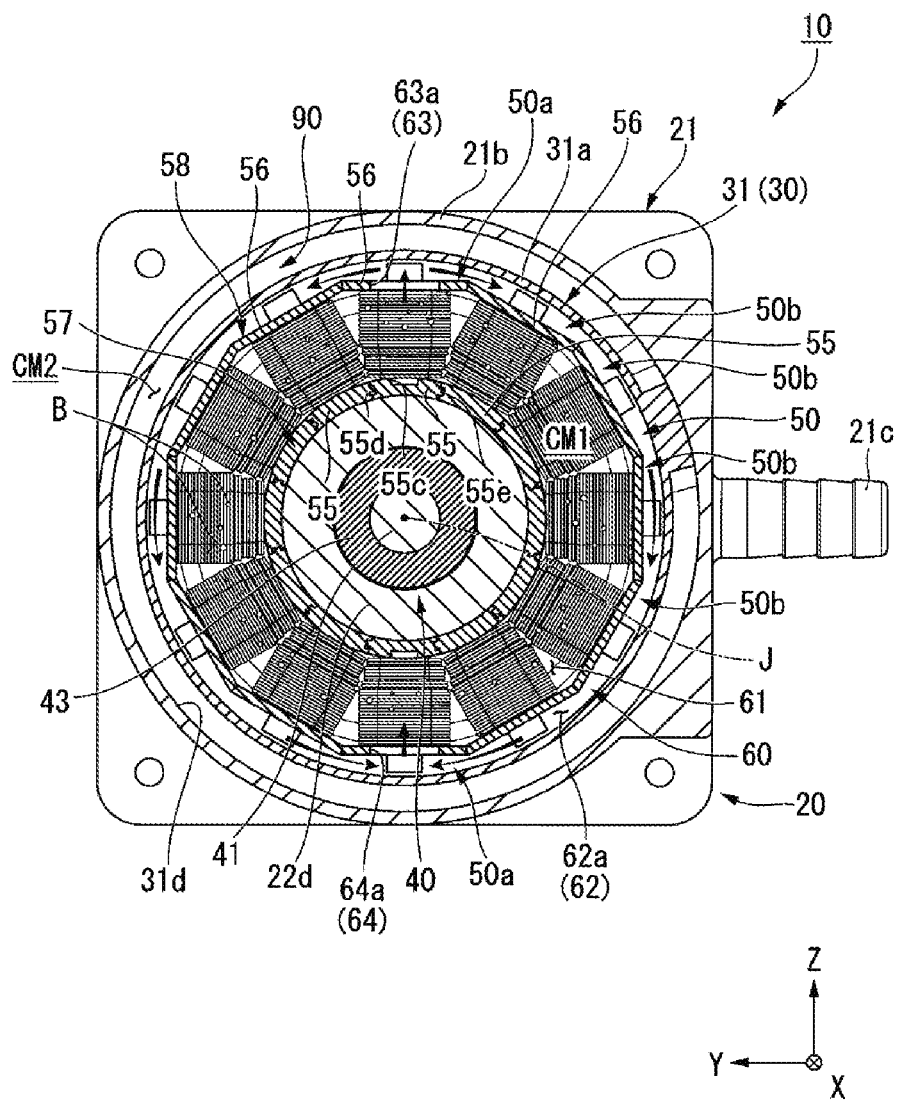
FIG. 3 is a view illustrating a motor of an example embodiment of the present disclosure, and is a sectional view taken along the line in FIG. 2.

The stator 50 is disposed on the radial-direction outer side of the rotor 40 and has a cylindrical shape so as to surround the rotor 40. As illustrated in FIG. 3, in the present embodiment, the stator 50 has a plurality of stator pieces 50a and 50b. The plurality of stator pieces 50a and 50b are disposed along the circumferential direction. The stator pieces 50a and 50b that are adjacent in the circumferential direction are connected to each other, and the stator 50, which has a cylindrical shape, is formed of the plurality of stator pieces 50a and 50b.

One stator piece 50a is disposed on the upper side of the center axis J and one stator piece 50a is disposed on the lower side of the center axis J. That is, the number of the stator pieces 50a is two. The upper end of the stator piece 50a on the upper side is the upper end of the stator 50. The lower end of the stator piece 50a on the lower side is the lower end of the stator 50. The stator pieces 50b are disposed in the circumferential direction between the two stator pieces 50a. In FIG. 3, five stator pieces 50b are disposed from one circumferential-direction side of the stator piece 50a on the upper side to another circumferential-direction side of the stator piece 50a on the lower side, and, five stator pieces 50b are disposed from the other circumferential-direction side of the stator piece 50a on the upper side to the one circumferential-direction side of the stator piece 50a on the lower side. That is, in FIG. 3, the total number of the stator pieces 50a and 50b is twelve. The structure of the stator pieces 50b differs from the structure of the stator pieces 50a only in that the stator pieces 50b do not have an insertion portion 55c, a first through hole 56c and a second through hole 56d, which will be described later. Therefore, in the following description, there are some cases where only the stator pieces 50a will be described as representative.

As illustrated in FIG. 2, the plurality of stator pieces 50a have teeth 51, coils 52, and insulators 53. That is, the stator 50 has a plurality of the teeth 51, a plurality of the coils 52, and a plurality of the insulators 53. The plurality of teeth 51 are disposed along the circumferential direction and extend in the radial direction. The plurality of coils 52 are wound around the corresponding teeth 51. The insulators 53 are attached to the corresponding teeth 51.

Figure 4:
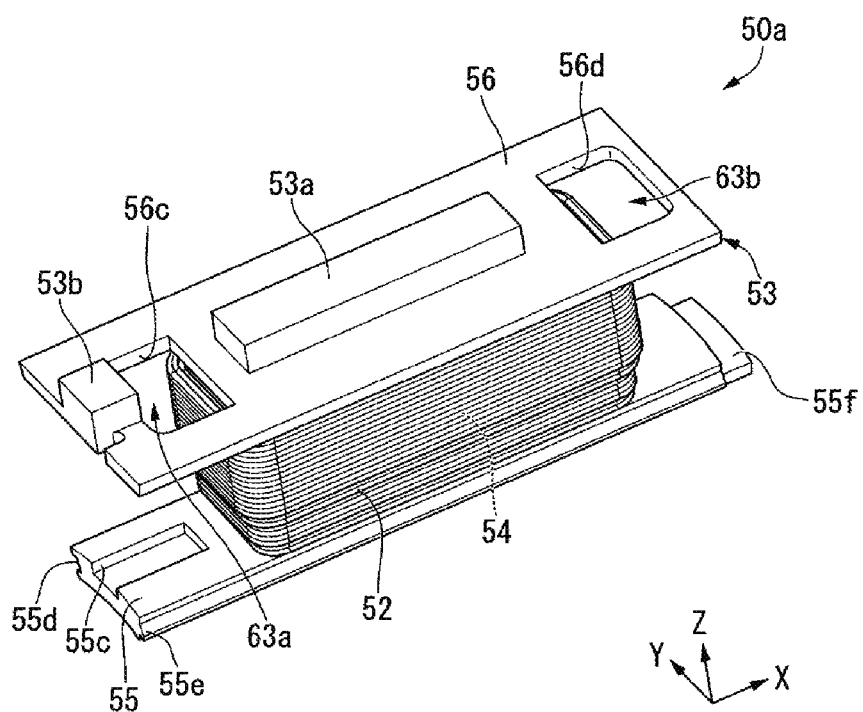
FIG. 4 is a perspective view illustrating a stator piece of an example embodiment of the present disclosure.

As illustrated in FIG. 4, each of the insulators 53 has a mounting portion 54, a first wall portion 55, and a second wall portion 56. The mounting portion 54 is disposed between the tooth 51 and the coil 52 and has a cylindrical shape covering the tooth 51. The mounting portion 54 opens on the radial-direction inner side. As illustrated in FIG. 2, the first wall portions 55 extend to both axial-direction sides from a radial-direction inner end of the mounting portion 54 and are connected to a first lid portion 22 and a second lid portion 20b described later. As illustrated in FIG. 3, the first wall portions 55 that are adjacent in the circumferential direction are connected to each other to form a first partition wall portion 57 that has a cylindrical shape. The first partition wall portion 57 has a cylindrical shape centered on the center axis J.

As illustrated in FIG. 4, each of the first wall portions 55 has a recessed portion 55d recessed from an end portion of the first wall portion 55 on the one circumferential-direction side toward the other circumferential-direction side, and a projecting portion 55e protruding from an end portion of the first wall portion 55 on the other circumferential-direction side toward the other circumferential-direction side. As illustrated in FIG. 3, the projecting portions 55e of the first wall portions 55 adjacent on the one circumferential-direction side are inserted into the recessed portions 55d. The projecting portions 55e are inserted into the recessed portions 55d of the first wall portions 55 adjacent on the other circumferential-direction side. Further, in FIG. 3, the one circumferential-direction side is a side toward the counterclockwise direction around the center axis J as seen from the front side toward the rear side, the other circumferential-direction side is a side toward the clockwise direction around the center axis J as seen from the front side toward the rear side.

In the present embodiment, the first wall portions 55 that are adjacent in the circumferential direction are fixed with a waterproof adhesive. More specifically, the waterproof adhesive is provided between the recessed portions 55d and the projecting portions 55e that mesh with each other and fixes the recessed portions 55d and the projecting portions 55e to each other, thereby fixing the first wall portions 55 adjacent in the circumferential direction to each other. With this configuration, it is possible to further suppress the first cooling medium CM1 from flowing into the rotor 40.

As illustrated in FIG. 4, each of the first wall portions 55 has the insertion portion 55c. The insertion portion 55c is provided in a portion of the first wall portion 55 extending forward from the mounting portion 54. The insertion portion 55c is recessed from the radial-direction outer side surface of the first wall portion 55 toward the radial-direction inner side. The insertion portion 55c opens on the front side. The first wall portion 55 has a fitting protruding portion 55f. The fitting protruding portion 55f is an end portion on the rear side of the first wall portion 55 and is a portion in which the radial dimension of the first wall portion 55 decreases.

As illustrated in FIG. 2, the second wall portions 56 extend from the radial-direction outer ends of the mounting portion 54 to both axial-direction sides, and are connected to the first lid portion 22 and the second lid portion 20b. As illustrated in FIG. 3, the second wall portions 56 that are adjacent in the circumferential direction are connected to each other to form a second partition wall portion 58 that has a cylindrical shape. The second partition wall portion 58 has a cylindrical shape centered on the center axis J. In FIG. 3, because a total of twelve stator pieces 50a and 50b are provided, the second partition wall portion 58 has a shape of a regular dodecagon cylinder. The radial-direction-outer-side surface of the second partition wall portion 58 is the radial-direction-outer-side surface of the stator 50.

As illustrated in FIG. 4, the second wall portion 56 has the first through hole 56c and the second through hole 56d, which are holes that penetrate the second wall portion 56 in the radial direction. The first through hole 56c is provided in a portion of the second wall portion 56 extending forward of the mounting portion 54. The second through hole 56d is provided in a portion of the second wall portion 56 extending rearward of the mounting portion 54.

Each of the plurality of stator pieces 50a has positioning projecting portions 53a and 53b. The positioning projecting portions 53a and 53b protrude from the second wall portion 56 to the radial-direction outer side. The positioning projecting portion 53a is disposed at the axial-direction center of the radial-direction-outer-side surface of the second wall portion 56. The positioning projecting portion 53a is disposed between the first through hole 56c and the second through hole 56d in the axial direction. The positioning projecting portion 53a is a rectangular parallelepiped extending in the axial direction. The positioning projecting portion 53b is disposed on a front end portion of the radial-direction-outer-side surface of the second wall portion 56. The positioning projecting portion 53b is disposed to the front of the first through hole 56c. The positioning projecting portion 53b has a rectangular parallelepiped shape.

As illustrated in FIG. 2, the housing 20 is disposed on the radial-direction outer side of the stator 50 and has a cylindrical shape that houses the rotor 40 and the stator 50. The housing 20 includes a jacket 21, a cover 24, an inner case 30, the first lid portion 22, and a plate 23. As illustrated in FIG. 1, the jacket 21 has a substantially rectangular cylindrical shape that opens on one axial-direction side and that extends in the axial direction. The radial-direction-inner-side surface of the jacket 21 has a cylindrical shape that extends in the axial direction and that is centered on the center axis J. The jacket 21 includes a jacket lid portion 21a, a jacket cylindrical portion 21b, a first connector 21c, and a second connector 21d.

The jacket lid portion 21a has a rectangular plate shape expanding in the radial direction. As illustrated in FIG. 2, the jacket lid portion 21a has an output shaft hole 21e penetrating the jacket lid portion 21a in the axial direction. An end portion of the shaft 41 on the rear side protrudes to the outside of the housing 20 through the output shaft hole 21e. The jacket cylindrical portion 21b extends to the front from an outer edge portion of the jacket lid portion 21a. The cover 24 that has a thin plate-like shape expanding in the radial direction is fitted to the radial-direction inner side of the jacket cylindrical portion 21b. The cover 24 is in contact with the front surface of the jacket lid portion 21a. As illustrated in FIG. 1, the first connector 21c and the second connector 21d each have a cylindrical shape projecting from the jacket cylindrical portion 21b to the radial-direction outer side. The inside of the first connector 21c and the inside of the second connector 21d are connected to a cooling flow path 90 described later.

Figure 5:
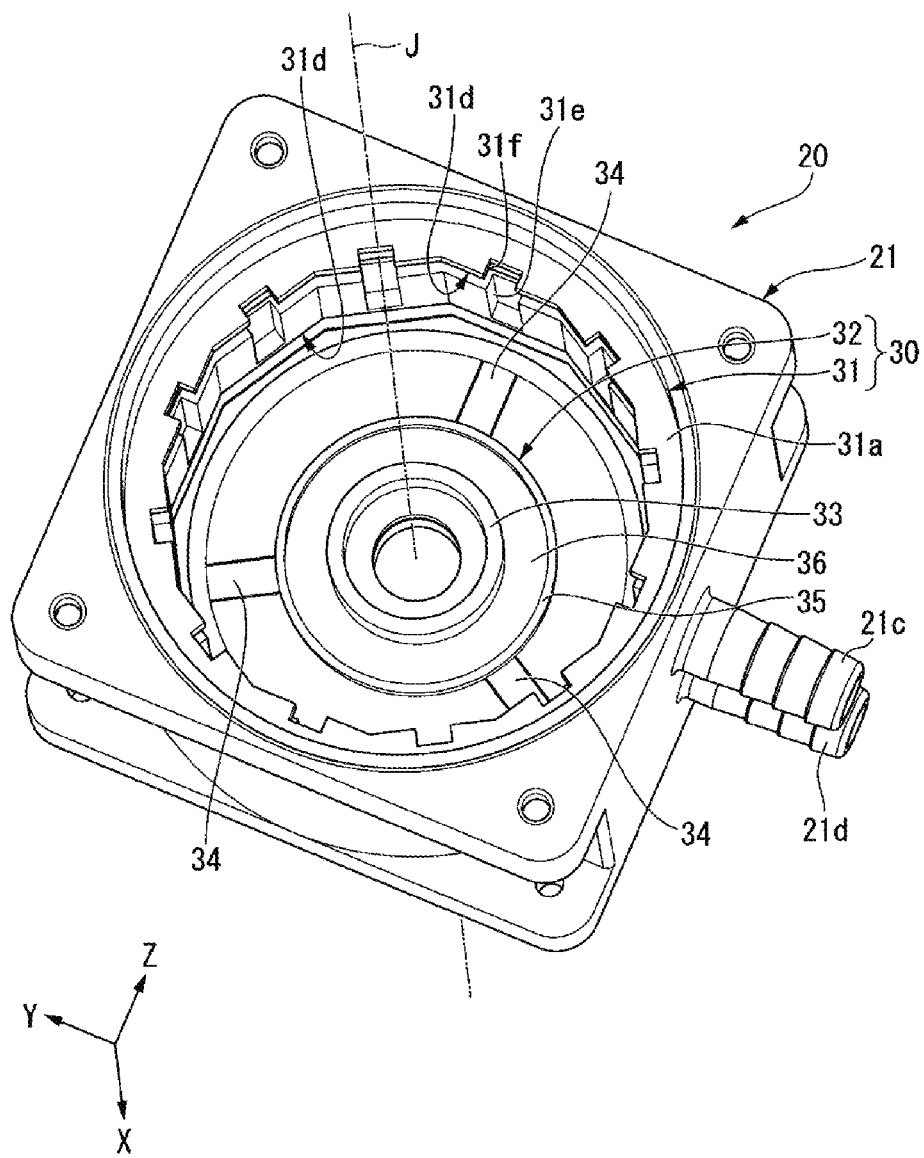
FIG. 5 is a perspective view illustrating a portion of a housing of an example embodiment of the present disclosure.
Figure 6:
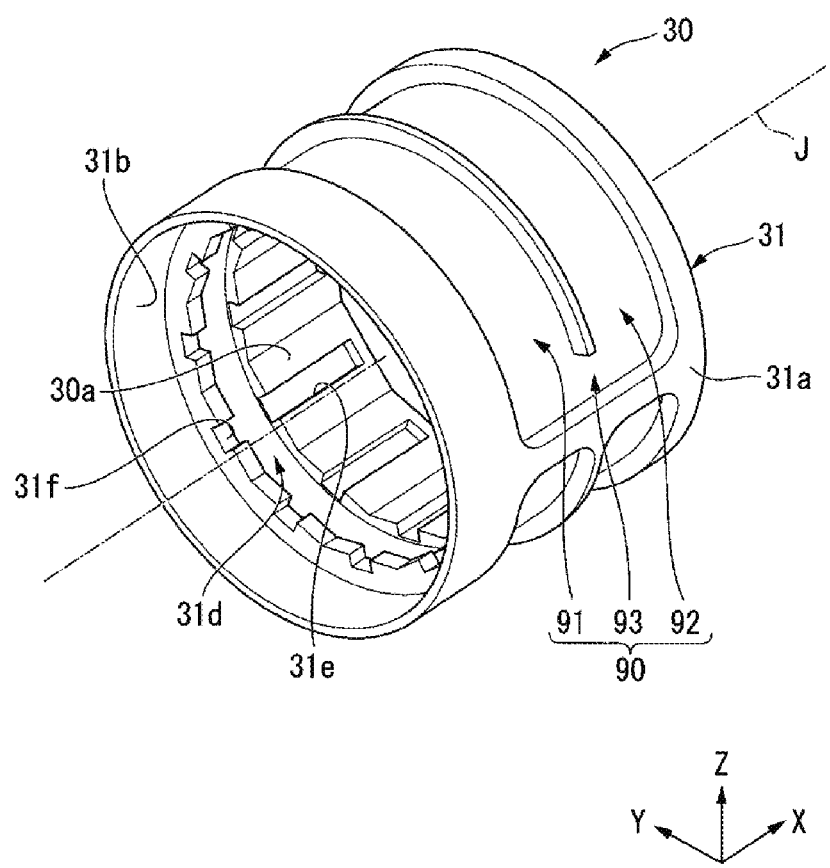
FIG. 6 is a perspective view illustrating an inner case of an example embodiment of the present disclosure.

As illustrated in FIG. 2, the inner case 30 is fitted on the radial-direction inner side of the jacket 21. As illustrated in FIG. 5 and FIG. 6, the inner case 30 has a cylindrical shape that extends in the axial direction and that is centered on the center axis J. As illustrated in FIG. 5, the inner case 30 has an inner case body 31 and a bottom portion 32. As illustrated in FIG. 6, the inner case body 31 has a cylindrical shape that opens at both axial-direction ends and extends in the axial direction around the center axis J. As illustrated in FIG. 2, the inner case body 31 has a small-diameter portion 31a and a large-diameter portion 31b.

The small-diameter portion 31a surrounds the stator 50 on the radial-direction outer side of the stator 50. As illustrated in FIG. 5, the radial-direction-inner-side surface of the small-diameter portion 31a is a polygonal cylindrical surface. In FIG. 5, the radial-direction-inner-side surface of the small-diameter portion 31a is a regular dodecagonal cylindrical surface. As illustrated in FIG. 3, the second partition wall portion 58 is fitted to the radial-direction inner side of the small-diameter portion 31a. The radial-direction-outer-side surface of the second partition wall portion 58, that is, the radial-direction-outer-side surface of the stator 50, is in contact with the radial-direction-inner-side surface of the small-diameter portion 31a.

As illustrated in FIG. 5, the small-diameter portion 31a has housing grooves 31d, a plurality of positioning recessed portions 31e, and a plurality of positioning recessed portions 31f. The housing grooves 31d are recessed from the radial-direction-inner-side surface of the small-diameter portion 31a toward the radial-direction outer side and extend in the circumferential direction. In FIG. 3, the housing grooves 31d are annular and extend over the entire circumferential direction. The surface of the housing grooves 31d facing toward the radial-direction inner side is a cylindrical surface. As illustrated in FIG. 2, the housing grooves 31d are provided at a front end portion of the small-diameter portion 31a and a rear end portion of the small-diameter portion 31a, respectively. As illustrated in FIG. 5, the positioning recessed portions 31e and 31f are recessed from the radial-direction-inner-side surface of the small-diameter portion 31a toward the radial-direction outer side at different positions from the housing groove 31d in the axial direction. The plurality of positioning recessed portions 31e and 31f are disposed along the circumferential direction. As illustrated in FIG. 2, the positioning recessed portions 31e are located at the axial-direction center of the small-diameter portion 31a. A front end portion of the positioning recessed portions 31e opens to the housing grooves 31d. The positioning recessed portions 31f are located on the front side of the housing grooves 31d. A rear end portion of the positioning recessed portions 31f opens to the housing grooves 31d. A front end portion of the positioning recessed portion 31f opens to the inside of the large-diameter portion 31b. The positioning projecting portions 53a are inserted into the positioning recessed portions 31e. The positioning projecting portions 53b are inserted into the positioning recessed portions 31e. As a result, the stator pieces 50a and 50b can be accurately positioned in the circumferential direction with respect to the housing 20.

As illustrated in FIG. 6, the small-diameter portion 31a includes the cooling flow path 90. That is, the housing 20 includes the cooling flow path 90. In FIG. 6, the cooling flow path 90 is provided on a radial-direction-outer-side surface of the small-diameter portion 31a. The cooling flow path 90 is a groove that is recessed from the radial-direction-outer-side surface of the small-diameter portion 31a toward the radial-direction inner side. The cooling flow path 90 includes a first flow path 91 and a second flow path 92 extending in the circumferential direction, and a connection flow path 93. The first flow path 91 and the second flow path 92 extend in the circumferential direction substantially over the entire outer circumference of the small-diameter portion 31a. The first flow path 91 and the second flow path 92 are disposed side by side in the axial direction. One circumferential-direction end of the first flow path 91 and one circumferential-direction end of the second flow path 92 are connected by the connection flow path 93. As illustrated in FIG. 2, an opening of the cooling flow path 90 is closed by the jacket cylindrical portion 21b from the radial-direction outer side. The cooling flow path 90 is arranged on the radial-direction outer side of the stator 50. The cooling flow path 90 overlaps at least a portion of the stator 50 in the radial direction.

As illustrated in FIG. 3, a second cooling medium CM2 flows in the cooling flow path 90 on the radial-direction outer side of the stator 50. For example, the second cooling medium CM2 flows through the inside of the cooling flow path 90 by flowing into the cooling flow path 90 from the first connector 21c and being discharged to the outside of the cooling flow path 90 from the second connector 21d. The first connector 21c is connected to a circumferential-direction end portion of the first flow path 91 on the side opposite to the side at which the connection flow path is connected. The second connector 21d is connected to a circumferential-direction end portion of the second flow path 92 on the side opposite to the side at which the connection flow path 93 is connected. By causing the second cooling medium CM2 to flow in the cooling flow path 90, the stator 50 can be cooled from the radial-direction outer side. The second cooling medium CM2 is, for example, water.

As illustrated in FIG. 2, the large-diameter portion 31b is positioned on the front side of the small-diameter portion 31a. In the large-diameter portion 31b, the inner diameter of the inner case body 31 is larger than the inner diameter of the small-diameter portion 31a. The large-diameter portion 31b is a front end portion of the inner case body 31. As illustrated in FIG. 5, the radial-direction-inner-side surface of the large-diameter portion 31b is a cylindrical surface.

The bottom portion 32 includes a disk portion 36, a bearing holding portion 33, connection portions 34, and an outer edge protruding portion 35. The disk portion 36 is disposed on the radial-direction inner side of a rear end portion of the inner case body 31. The disk portion 36 has a disk shape centered on the center axis J. The disk portion 36 has a through hole through which the shaft 41 passes through the center. As illustrated in FIG. 2, the disk portion 36 is in contact with the front surface of the cover 24. As illustrated in FIG. 5, the bearing holding portion 33 has an annular shape protruding forward from the disk portion 36.

As illustrated in FIG. 2, a bearing 44 supporting the shaft 41 is held on the radial-direction inner side of the bearing holding portion 33. As illustrated in FIG. 5, the connection portions 34 have a plate shape connecting the radial-direction outer end of the disk portion 36 and the radial-direction inner end of the rear end portion of the inner case body 31. Three connection portions 34 are provided at equal intervals along the circumferential direction. The outer edge protruding portion 35 has an annular shape protruding forward from the radial-direction outer edge of the disk portion 36. As illustrated in FIG. 2, a cylindrical portion in which the fitting protruding portions 55f that are adjacent in the circumferential direction are connected is fitted on the radial-direction inner side of the outer edge protruding portion 35. The rear end of the fitting protruding portions 55f is in contact with the front surface of the disk portion 36.

The jacket cylindrical portion 21b of the jacket 21 and the inner case body 31 overlap in the radial direction to form a cylindrical portion 20a extending in the axial direction. That is, the housing 20 includes the cylindrical portion 20a. The inner diameter of the cylindrical portion 20a is the inner diameter of the inner case body 31. That is, the cylindrical portion 20a includes the small-diameter portion 31a and the large-diameter portion 31b having an inner diameter larger than that of the small-diameter portion 31a. The radial-direction-inner-side surface of the cylindrical portion 20a is the radial-direction-inner-side surface of the inner case body 31. That is, the radial-direction-inner-side surface of the cylindrical portion 20a includes the radial-direction-inner-side surface of the small-diameter portion 31a. The cylindrical portion 20a includes the housing grooves 31d and the positioning recessed portions 31e and 31f. The housing grooves 31d are recessed from the radial-direction-inner-side surface of the cylindrical portion 20a toward the radial-direction outer side. The positioning recessed portions 31e and 31f are recessed from the radial-direction-inner-side surface of the cylindrical portion 20a toward the radial-direction outer side.

Figure 7:
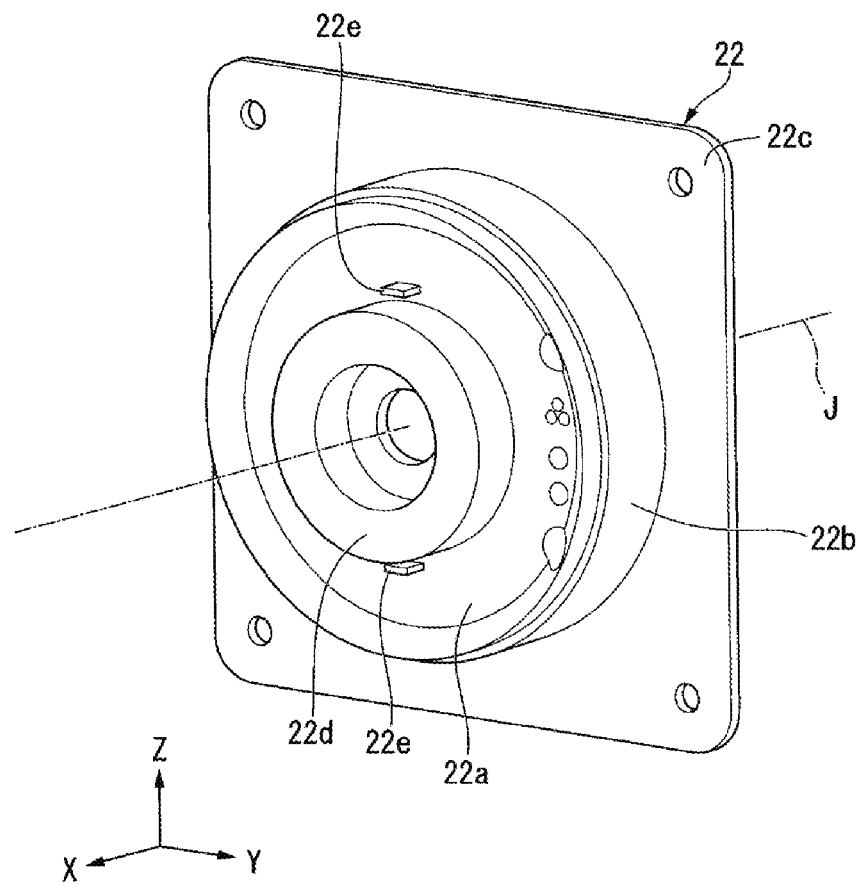
FIG. 7 is a perspective view illustrating a first lid portion of an example embodiment of the present disclosure.

The first lid portion 22 is disposed on the front side of the stator 50. The first lid portion 22 closes one axial-direction end of the cylindrical portion 20a. The first lid portion 22 has a holder disk portion 22a, a holder cylindrical portion 22b, a flange portion 22c, a bearing holding portion 22d, and insertion plate portions 22e. As illustrated in FIG. 2 and FIG. 7, the holder disk portion 22a has a disk shape centered on the center axis J. The holder disk portion 22a is disposed on the radial-direction inner side of the inner case body 31. The holder disk portion 22a includes a through hole through which the front end portion of the shaft 41 passes in the center. The holder cylindrical portion 22b is cylindrical and extends forward from the radial-direction outer edge of the holder disk portion 22a. The holder cylindrical portion 22b is disposed away from the radial-direction-inner-side surface of the large-diameter portion 31b on the radial-direction inner side. The flange portion 22c has a substantially square plate shape that expands in the radial direction from a front end portion of the holder cylindrical portion 22b. As illustrated in FIG. 2, the radial-direction outer edge portion of the flange portion 22c is in contact with the front end portion of the cylindrical portion 20a, that is, the front end portion of the inner case body 31 and the front end portion of the jacket cylindrical portion 21b, from the front side.

The bearing holding portion 22d has an annular shape protruding rearward from the holder disk portion 22a. A bearing 43 for supporting the shaft 41 is held on the radial-direction inner side of the bearing holding portion 22d. The bearing holding portion 22d is fitted on the radial-direction inner side of the first partition wall portion 57. A front end portion of the first partition wall portion 57, that is, a front end portion of the first wall portions 55 contacts the rear surface of the holder disk portion 22a. As illustrated in FIG. 7, the insertion plate portions 22e have a plate shape protruding rearward from the holder disk portion 22a. The insertion plate portions 22e are provided on the upper side of the bearing holding portion 22d and the lower side of the bearing holding portion 22d, respectively. As illustrated in FIG. 2, the insertion plate portions 22e are inserted into the insertion portions 55c. The plate 23 is fixed to the front surface of the flange portion 22c. As illustrated in FIG. 1, the plate 23 has a square frame shape.

As illustrated in FIG. 2, the jacket lid portion 21a, the cover 24, and the bottom portion 32 overlap in the axial direction and form the second lid portion 20b that closes the other axial-direction end of the cylindrical portion 20a. That is, the housing 20 includes the second lid portion 20b.

As illustrated in FIG. 3, a sealed chamber 60 that is hermetically sealed and that is filled with the first cooling medium CM1 is provided between the housing 20 and the rotor 40. As illustrated in FIG. 2, a housing space 65 housing the rotor core 42 is provided on the radial-direction inner side of the sealed chamber 60. The sealed chamber 60 includes an inner chamber 61, outer chambers 62, upper connection portions 63, and lower connection portions 64. The inner chamber 61 houses a plurality of coils 52. The plurality of coils 52 are immersed in the first cooling medium CM1 in the inner chamber 61. As illustrated in FIG. 3, each of the outer chambers 62 is disposed on the radial-direction outer side of the inner chamber 61 and extends in the circumferential direction. The upper connection portions 63 are located vertically above the shaft 41 and connect the inner chamber 61 and the outer chamber 62 to each other. The lower connection portions 64 are located vertically below the shaft 41 and connect the inner chamber 61 and the outer chamber 62 to each other.

When the motor 10 is driven, the coils 52 generate heat. Because the plurality of coils 52 are housed in the inner chamber 61 of the sealed chamber 60 filled with the first cooling medium CM1, the first cooling medium CM1 in the inner chamber 61 is heated as the coils 52 generate heat. The warmed first cooling medium CM1 rises in the inner chamber 61 and flows into the outer chambers 62 via the upper connection portions 63. As a result, the first cooling medium CM1 in the outer chambers 62 is pushed and flows into the inner chamber 61 from the lower connection portions 64. Therefore, as indicated by arrows in FIG. 3, a flow of the first cooling medium CM1 is generated in the sealed chamber 60. Here, because the outer chambers 62 are disposed on the radial-direction outer side of the inner chamber 61, the outer chambers 62 are closer to the outer portion of the housing 20 than the inner chamber 61. Therefore, the heat of the first cooling medium CM1 in the outer chambers 62 is easily released to the outside via the housing 20. As a result, the temperature of the first cooling medium CM1 in the outer chambers 62 is kept lower than the temperature of the first cooling medium CM1 in the inner chamber 61. Therefore, by circulation of the first cooling medium CM1 between the inner chamber 61 and the outer chambers 62, the relatively low temperature first cooling medium CM1 flows into the inner chamber 61. As a result, it is possible to cool the coils 52 that generate heat by driving the motor 10.

Further, when the heat generation of the coils 52 increases due to an increase in the rotational speed of the motor 10 or the like, the first cooling medium CM1 in the inner chamber 61 evaporates and generates bubbles B. The bubbles B rise in the inner chamber 61 and enter the outer chambers 62 from the upper connection portions 63. As the bubbles B rise in the inner chamber 61, the rate at which the first cooling medium CM1 of the liquid in the inner chamber 61 rises increases, and as a result, the above-described speed of circulation generated in the sealed chamber 60 can be increased. As a result, the coils 52 can be further cooled. The effect of increasing the speed of the circulation by the bubbles B increases as the heat generation of the coils 52 increases and the bubbles B are generated. That is, as the coils 52 generate heat, the effect of cooling the coils 52 increases, and the coils 52 can be further cooled. As described above, according to the present embodiment, the speed at which the first cooling medium CM1 circulates is automatically adjusted according to the magnitude of the heat generation of the coils 52, thereby improving the cooling efficiency of the coils 52.

In addition, as described above, the temperature of the first cooling medium CM1 in the outer chambers 62 is lower than that in the inner chamber 61. Therefore, the bubbles B entering the outer chambers 62 from the inner chamber 61 are cooled and returned to the liquid. That is, the outer chambers 62 function as condensers. Thus, the generated bubbles B can be sequentially returned to the liquid, and a large amount of the bubbles B can be suppressed from staying in the sealed chamber 60. Therefore, it is not necessary to separately provide a large condenser to return a large amount of bubbles B to the liquid, and it is possible to suppress an increase in the size of the cooling unit. As a result, it is possible to prevent the size of the motor 10 from becoming larger.

As described above, according to the present embodiment, the motor 10 having a structure capable of improving the cooling efficiency is obtained while suppressing an increase in the size of the motor in which the cooling unit is mounted.

In addition, according to the present embodiment, the plurality of the coils 52 are housed in one inner chamber 61. Therefore, for example, the movement of the bubbles B in the inner chamber 61 is less likely to be disturbed as compared with a case where the plurality of the coils 52 are housed in separate inner chambers, respectively. As a result, by movement of the bubbles B, the speed of circulation between the inner chamber 61 and the outer chambers 62 can be appropriately increased, thereby further improving the cooling efficiency.

In addition, according to the present embodiment, the cooling flow path 90 overlaps at least a portion of the outer chambers 62 in the radial direction. Therefore, the heat of the first cooling medium CM1 in the outer chambers 62 can be released by the second cooling medium CM2 of the cooling flow path 90. Thus, the temperature of the first cooling medium CM1 in the outer chambers 62 can be kept lower, and the effect of cooling the coils 52 due to the above-described circulation can be increased. In addition, the function of the outer chambers 62 as condensers can be improved. In addition, as described above, because the stator can be cooled from the radial-direction outer side by the cooling flow path 90, it is possible to cool the stator 50 from the radial-direction outer side and the radial-direction inner side by the cooling flow path 90 and the inner chamber 61, respectively. Therefore, the cooling efficiency of the stator 50 can be further improved.

In the present embodiment, the first cooling medium CM1 has insulating properties. Therefore, it is not necessary to insulate the plurality of the coils 52 immersed in the first cooling medium CM1, which is simple. The first cooling medium CM1 is, for example, a fluorine-based inert liquid.

In FIG. 3, the inner chamber 61 and the outer chambers 62 are annular along the circumferential direction. As illustrated in FIG. 2, the inner chamber 61 extends in the axial direction. As illustrated in FIG. 2 and FIG. 3, the inner chamber 61 is configured to be surrounded by the first partition wall portion 57, the second partition wall portion 58, the first lid portion 22, and the second lid portion 20b. More specifically, as illustrated in FIG. 3, the radial-direction-inner-side surface of the second partition wall portion 58 forms the radial-direction-outer-side surface of the inner chamber 61. The radial-direction-outer-side surface of the first partition wall portion 57 forms the radial-direction-inner-side surface of the inner chamber 61. Thus, it is possible for the radial-direction inner side space of the first partition wall portion 57 to be the housing space 65 in which the rotor 40 is housed, and it is possible to partition the inner chamber 61 and the rotor 40 by the first partition wall portion 57. Therefore, it is possible to suppress leakage of the first cooling medium CM1 in the inner chamber 61 to the housing space 65 in which the rotor 40 is housed. In addition, because the first partition wall portion 57 is formed by the insulator 53, there is no need to separately provide a member for partitioning the space between the inner chamber 61 and the rotor 40 and an increase in the number of components of the motor 10 can be suppressed.

In the present embodiment, as described above, the plurality of the first wall portions 55 forming the first partition wall portion 57 have the recessed portions 55d and the projecting portions 55e opposed in the circumferential direction that are engaged with each other and connected to each other. Therefore, it is possible to further strengthen the connection between the first wall portions 55, and to suppress the occurrence of a gap at the connection portions between the first wall portions 55. As a result, this makes it possible to further suppress the leakage of the first cooling medium CM1 from the inner chamber 61 to the housing space 65 by the first partition wall portion 57. In addition, because the first wall portions 55 are fixed to each other with the waterproof adhesive, it is possible to seal the connection portions between the first wall portions 55, and leakage of the first cooling medium CM1 from the inner chamber 61 to the housing space 65 can be further suppressed.

The outer chambers 62 are each formed of the second partition wall portion 58 and the small-diameter portion 31a. More specifically, the outer chambers 62 are formed so as to be surrounded by the radial-direction-outer-side surface of the second partition wall portion 58 and the inner side surface of the housing grooves 31d. The radial-direction-outer-side surface of the second partition wall portion 58 forms the radial-direction-inner-side surface of the outer chamber 62. That is, the second partition wall portion 58 formed of the plurality of insulators 53 can partition the inner chamber 61 and the outer chamber 62. Therefore, it is not necessary to additionally provide a member for partitioning between the inner chamber 61 and the outer chambers 62, so that an increase in the number of components of the motor 10 can be suppressed. The inner surfaces of the housing grooves 31d form the radial-direction-outer-side surface of the outer chambers 62 and the axial-direction-side surfaces of the outer chambers 62. More specifically, the radial-direction-inner-side-facing surface of the housing grooves 31d forms the radial-direction-outer-side surface of the outer chambers 62. As described above, the radial-direction-inner-side-facing surface of the housing grooves 31d and the radial-direction-outer-side surface of the second partition wall portion 58, that is, the radial-direction-outer-side surface of the stator 50 form at least a portion of the inner surface of the outer chambers 62. Therefore, even when the plurality of stator pieces 50a and 50b are positioned by the positioning recessed portions 31e and 31f and the positioning projecting portions 53a and 53b, it is possible to form the outer chambers 62 between the stator 50 and the housing 20 due to the housing grooves 31d. In addition, by forming the stator 50 with the plurality of stator pieces 50a and 50b, it is possible to form the inner chamber 61 and the outer chambers 62 by combining the plurality of stator pieces 50a and 50b. As a result, by replacing a portion of the stator pieces 50a and 50b, it is possible to easily repair the inner chamber 61 and the outer chambers 62, or to easily change the configuration, or the like.

As illustrated in FIG. 2, the outer chambers 62 include a first outer chamber 62a connected to the front end portion of the inner chamber 61 and a second outer chamber 62b connected to the rear end portion of the inner chamber 61. Therefore, circulation of the first cooling medium CM1 can be generated at both axial-direction ends by the inner chamber 61 and the two outer chambers 62. As a result, the coils 52 can be further cooled. In addition, in the case of providing the cooling flow path 90 as in the present embodiment, by providing the outer chambers 62 at both end portions of the inner chamber 61, respectively, it is possible to have a configuration in which the outer chambers 62 are not provided at the axial center portion of the stator 50. Therefore, it is easy to cool the central portion in the axial direction of the stator 50 by the cooling flow path 90. The stator 50 is most likely to generate heat at the center portion in the axial direction. Therefore, the cooling efficiency of the stator 50 can be further improved.

As illustrated in FIG. 3, the upper connection portions 63 are located at the upper end of the inner chamber 61. The lower connection portions 64 are located at the lower end of the inner chamber 61. Because the outer chambers 62 are annular along the circumferential direction, the first cooling medium CM1 flowing into the outer chambers 62 from the upper connection portions 63 flows toward both circumferential-direction sides, and flows in the outer chambers 62 along the circumferential direction, substantially half way around the stator 50, and returns to the inside of the inner chamber 61 from the lower connection portions 64. That is, in the present embodiment, circulation of the first cooling medium CM1 occurs over the entire circumference in the circumferential direction. As a result, cooling efficiency can be further improved.

As illustrated in FIG. 2, the upper connection portions 63 include a first upper connection portion 63a connecting the inner chamber 61 and the first outer chamber 62a, and a second upper connection portion 63b connecting the inner chamber 61 and the second outer chamber 62b. The lower connection portions 64 include a first lower connection portion 64a connecting the inner chamber 61 and the first outer chamber 62a to each other and a second lower connection portion 64b connecting the inner chamber 61 and the second outer chamber 62b to each other. As illustrated in FIG. 4, the first upper connection portion 63a is the first through hole 56c of the stator piece 50a on the upper side. The second upper connection portion 63b is the second through hole 56d of the stator piece 50a on the upper side. Although not illustrated, the first lower connection portion 64a is the first through hole 56c of the stator piece 50a on the lower side. The second lower connection portion 64b is the second through hole 56d of the stator piece 50a on the lower side. In this way, in the present embodiment, the upper connection portions 63 and the lower connection portions 64 are holes that penetrate the second wall portions 56, that is, the second partition wall portion 58, in the radial direction. Therefore, it is easy to create the upper connection portions 63 and the lower connection portions 64.

Figure 8:
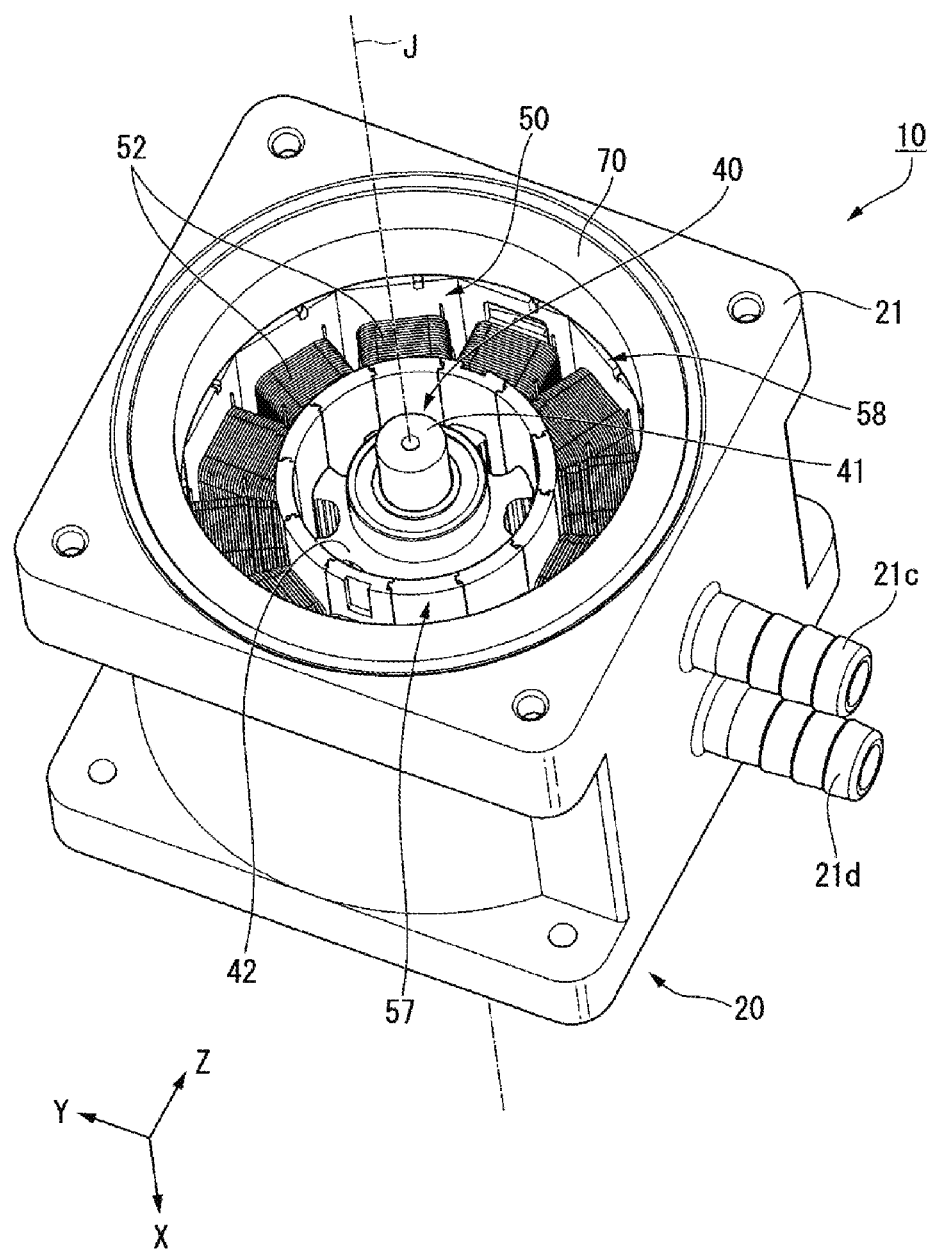
FIG. 8 is a perspective view illustrating a portion of the motor according to an example embodiment of the present disclosure.

As illustrated in FIG. 2, the sealing member 70 is disposed on the radial-direction inner side of the large-diameter portion 31b. More specifically, the sealing member 70 is disposed in the radial direction between the radial-direction-inner-side surface of the large-diameter portion 31b and the radial-direction-outer-side surface of the holder cylindrical portion 22b. As illustrated in FIG. 8, the sealing member 70 has an annular shape centered on the center axis J. As illustrated in FIG. 2, the sealing member 70 seals the boundary portion between the radial-direction-inner-side surface of the small-diameter portion 31a and the radial-direction-outer-side surface of the second partition wall portion 58, that is, the radial-direction-outer-side surface of the stator 50 from the front side. Thus, the first cooling medium CM1 in the outer chamber 62 can be prevented from leaking from the space between the radial-direction-inner-side surface of the small-diameter portion 31a and the radial-direction-outer-side surface of the second partition wall portion 58. In the present embodiment, in the sealing member 70, it is possible to suppress leakage of the first cooling medium CM1 in the first outer chamber 62a from the space between the radial-direction-inner-side surface of the small-diameter portion 31a and the radial-direction-outer-side surface of the second partition wall portion 58 to the front side. The sealing member 70 is, for example, a rubber member.

As illustrated in FIG. 1, the pressure-adjusting device 80 is fixed to the first lid portion 22. The pressure-adjusting device 80 extends in the axial direction. As illustrated in FIG. 2, the pressure-adjusting device 80 includes a connection cylindrical portion 82 and a pressure-adjusting portion 81. The connection cylindrical portion 82 extends in the axial direction and has a cylindrical shape that opens to both axial-direction sides. The connection cylindrical portion 82 penetrates the first lid portion 22 in the axial direction and is fixed to the first lid portion 22. A rear end portion of the connection cylindrical portion 82 is connected to a front end portion of the inner chamber 61. Thus, the pressure-adjusting device 80 is connected to an axial-direction end portion of the inner chamber 61. The pressure-adjusting portion 81 extends in the axial direction. The pressure-adjusting portion 81 is in the shape of a bag whose front end portion is closed and whose rear end portion is open. The rear end portion of the pressure-adjusting portion 81 is fitted and attached to the front end portion of the connection cylindrical portion 82 from the radial-direction outer side. The interior of the pressure-adjusting portion 81 communicates with the inner chamber 61 via the interior of the connection cylindrical portion 82. The pressure-adjusting portion 81 is formed of an elastic body. Therefore, in the case where the first cooling medium CM1 is vaporized and air bubbles B are generated, it is possible to suppress an increase in pressure in the sealed chamber 60 by inflating the pressure-adjusting portion 81 as indicated by the two-dot chain line in FIG. 2. As a result, the boiling point of the first cooling medium CM1 can be suppressed from rising, and the bubbles B can be appropriately generated. Therefore, it is possible to suppress a decrease in cooling efficiency. Further, even when no bubbles B are generated, the pressure adjustment caused by the temperature rise of the first cooling medium CM1 due to the volume expansion of the first cooling medium CM1 can be suppressed by the pressure-adjusting portion 81.

For example, even when the first partition wall portion 57 or the second partition wall portion 58 is provided with an elastic portion that elastically deforms in the radial direction, it is possible to suppress the pressure change in the sealed chamber 60. However, in this case, the motor 10 tends to increase in size in the radial direction. In addition, in order to secure the portion where the elastic portion is provided, it is necessary to increase the size of the first partition wall portion 57 or the second partition wall portion 58 in the axial direction, and the stator 50 tends to increase in size. On the other hand, according to the present embodiment, because the pressure-adjusting device 80 is connected to the axial-direction end portion of the inner chamber 61, it is possible to suppress the motor 10 from increasing in size in the radial direction, and the stator 50 can be suppressed from increasing in size in the axial direction.

Further, both circumferential-direction ends of the first wall portions 55 may have connection recessed portions that are recessed in the circumferential direction. In this case, the stator 50 has plate members inserted into both of the mutually opposite connection recessed portions of the stator pieces 50a and 50b that are adjacent in the circumferential direction. As a result, by engaging the plate members and the connection recessed portions, it is possible to firmly connect the first wall portions 55 that are adjacent in the circumferential direction.

In addition, the first cooling medium CM1 is not particularly limited as long as it can cool the coils 52. The first cooling medium CM1 need not have insulating properties. In this case, for example, the coils 52 are insulated. In addition, the first cooling medium CM1 and the second cooling medium CM2 may be the same cooling medium. In addition, the cooling flow path 90 may overlap the outer chambers 62 in the axial direction. Even in this case, the heat of the first cooling medium CM1 in the outer chambers 62 can be released by the second cooling medium CM2.

In addition, the number of the outer chambers 62 may be one, or three or more. In addition, the housing may be formed of a single member.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor comprising:
   a rotor including a shaft centered on a center axis that extends in a horizontal direction and a rotor core fixed to the shaft;
   a stator that has a cylindrical shape, that is on a radial-direction outer side of the rotor, and that surrounds the rotor; and
   a housing that has a cylindrical shape, that is on the radial-direction outer side of the stator, and that houses the rotor and the stator; wherein
   the stator includes:
      a plurality of teeth provided along a circumferential direction and extending in a radial direction; and
      a plurality of coils wound around the plurality of teeth, respectively;
   a sealed chamber hermetically sealed and filled with a first cooling medium is provided between the housing and the rotor;
   a housing space in which the rotor core is housed is provided on a radial-direction inner side of the sealed chamber; and
   the sealed chamber includes:
      an inner chamber that houses the plurality of coils;
      outer chambers that are on the radial-direction outer side of the inner chamber and define annuluses that extend along the entire circumferential direction;
      upper connection portions that are located vertically above the shaft and that connect the inner chamber and the outer chambers to each other; and
      lower connection portions, that connect the inner chamber and the outer chambers to each other, entireties of the lower connection portions being located vertically below the shaft.

2. The motor according to claim 1, wherein
   the inner chamber is annular along the circumferential direction;
   the upper connection portions are located at an upper end of the inner chamber; and
   the lower connection portions are located at a lower end of the inner chamber.

3. The motor according to claim 1, wherein
   the inner chamber extends in an axial direction; and
   the outer chambers include a first outer chamber connected to an end portion of the inner chamber on one axial-direction side and a second outer chamber connected to an end portion of the inner chamber on another axial-direction side.

4. The motor according to claim 1, wherein
   the housing includes a cylindrical portion extending in the axial direction; and
   the cylindrical portion includes:
      housing grooves that are recessed from a radial-direction-inner-side surface of the cylindrical portion toward the radial-direction outer side and that extend in the circumferential direction; and
      a plurality of positioning recessed portions recessed from the radial-direction-inner-side surface of the cylindrical portion toward the radial-direction outer side at positions different from the housing grooves in the axial direction and disposed along the circumferential direction;
   the stator includes a plurality of stator pieces having the teeth and the coils provided thereon;
   the plurality of stator pieces respectively include positioning projecting portions inserted into the positioning recessed portions; and
   surfaces of the housing grooves facing toward the radial-direction inner side and a radial-direction-outer-side surface of the stator define at least a portion of inner surfaces of the outer chambers.

5. The motor according to claim 4, wherein the cylindrical portion includes:
   a small-diameter portion surrounding the stator on the radial-direction outer side of the stator; and
   a large-diameter portion disposed on one side of the small-diameter portion in the axial direction and having an inner diameter larger than that of the small-diameter portion; wherein
   a seal that seals a boundary portion between a radial-direction-inner-side surface of the small-diameter portion and the radial-direction-outer-side surface of the stator from one side in the axial direction is disposed on the radial-direction inner side of the large-diameter portion.

6. The motor according to claim 4, wherein the housing includes:
   a first lid portion that closes one axial-direction end of the cylindrical portion; and a second lid portion that closes another axial-direction end of the cylindrical portion;
wherein
the plurality of stator pieces include insulators mounted on the teeth;
each of the insulators includes:
a mounting portion that has a cylindrical shape, that is between a corresponding one of the teeth and a corresponding one of the coils, and that covers the tooth; and
a first wall portion extending from both ends in the axial direction from a radial-direction inner end of the mounting portion and connected to the first lid portion and the second lid portion;
first wall portions that are adjacent in the circumferential direction are connected to each other to define a first partition wall portion that has a cylindrical shape; and
a radial-direction-outer-side surface of the first partition wall portion defines a radial-direction-inner-side surface of the inner chamber.

7. The motor according to claim 6, wherein
the first wall portion includes a recessed portion recessed from an end portion of the first wall portion on one circumferential-direction side toward another circumferential-direction side and a projecting portion protruding from an end portion of the first wall portion on the other circumferential-direction side toward the other circumferential-direction side;
a projecting portion of the first wall portion that is adjacent on the one circumferential-direction side is inserted into the recessed portion; and
the projecting portion is inserted into a recessed portion of the first wall portion that is adjacent on the other circumferential-direction side.

8. The motor according to claim 6, wherein
both circumferential-direction ends of the first wall portion include connection recessed portions recessed in the circumferential direction; and
the stator includes plates respectively inserted into both of the connection recessed portions opposed to each other in the stator pieces that are adjacent in the circumferential direction.

9. The motor according to claim 7, wherein ones of the first wall portions that are adjacent in the circumferential direction are fixed with a waterproof adhesive.

10. The motor according to claim 6, wherein
each of the insulators includes a second wall portion extending from radial-direction outer ends of the mounting portion to both sides in the axial direction and connected to the first lid portion and the second lid portion;
the second wall portions that are adjacent in the circumferential direction are connected to each other to define a second partition wall portion that has a cylindrical shape;
a radial-direction-inner-side surface of the second partition wall portion defines a radial-direction-outer-side surface of the inner chamber;
a radial-direction-outer-side surface of the second partition wall portion defines a radial-direction-inner-side surface of corresponding one of the outer chambers; and
the upper connection portions and the lower connection portions include holes that penetrate the second partition wall in the radial direction.

11. The motor according to claim 1, further comprising:
a pressure-adjusting device connected to an axial-direction end portion of the inner chamber; wherein
the pressure-adjusting device includes an elastic material in a bag shape having an interior communicating with the inner chamber.

12. The motor according to claim 1, wherein
the housing includes a cooling flow path through which a second cooling medium flows on the radial-direction outer side of the stator; and
the cooling flow path overlaps at least a portion of the outer chambers in the radial direction.

13. The motor according to claim 1, wherein the first cooling medium has an insulating property.

* * * * *